United States Patent

[11] 3,625,981

| [72] | Inventor | John Kollar |
|---|---|---|
| | | Wyckoff, N.J. |
| [21] | Appl. No. | 722,150 |
| [22] | Filed | Apr. 18, 1968 |
| [45] | Patented | Dec. 7, 1971 |
| [73] | Assignee | Halcon International, Inc. |
| | | Continuation-in-part of application Ser. No. 419,568, Dec. 18, 1964, now abandoned. This application Apr. 18, 1968, Ser. No. 722,150 |

[54] PROCESS FOR PREPARING GLYCIDOL
9 Claims, No Drawings

| [52] | U.S. Cl. | 260/348.5 L |
|---|---|---|
| [51] | Int. Cl. | C07d 1/18 |
| [50] | Field of Search | 260/348.5 LL |

[56] References Cited

UNITED STATES PATENTS

| 2,833,787 | 5/1958 | Carlson et al. | 260/348.5 |
|---|---|---|---|
| 3,350,422 | 10/1967 | Kollar | 260/348.5 |
| 3,351,635 | 11/1967 | Kollar | 260/348.5 |
| 2,776,301 | 1/1957 | Payne et al. | 260/348.5 |

FOREIGN PATENTS

| 1,374,882 | 8/1964 | France | 260/348.5 |
|---|---|---|---|

OTHER REFERENCES

E.G.E. Hawkins, Journal Chem. Soc. (London) (1950) pp. 2,169– 2,173.

*Primary Examiner*—Norma S. Milestone
*Attorneys*—William C. Long, Mario A. Monaco, Morris Wiseman and David Dick ABSTRACT: This invention relates to a process for preparing glycidol, by epoxidation of allyl alcohol with an organic hydroperoxide in the presence of an inorganic vanadium compound. Glycidol can be readily hydrolyzed to produce glycerine an important chemical of commerce.

PROCESS FOR PREPARING GLYCIDOL

This application is a continuation in part application of U.S. Ser. No. 419,568, filed Dec. 18, 1964 and now abandoned.

The present invention is concerned with a new and improved method for the preparation of glycidol. In particular, the invention is concerned with the preparation of glycidol from allyl alcohol.

Glycidol is an important chemical useful in he preparation of glycerine. Glycerine is, of course, an important chemical of commerce. Although various processes for the production of glycerine are known and are commercially employed, there remains considerable room for improving the efficiency and economy of such previous commercial processes.

It is an object of the present invention to provide a method for the production of glycidol, which upon hydrolysis can readily be converted to glycerine.

Other objects will be apparent from the following description of the inventive process.

In accordance with the present invention, allyl alcohol is epoxidized by reaction with an organic hydroperoxide in the presence of an inorganic vanadium compound, to the corresponding oxirane compound, which compound may be hydrolyzed to glycerine.

By the above reaction, glycidol is prepared in exceedingly high yield and selectivity.

In the epoxidation of allyl alcohol the surprising discovery has been made that vanadium in the inorganic form is an outstanding and uniquely effective catalyst. This is indeed surprising when it is considered that while soluble vanadium compounds such as the naphthenate or stearate are good catalysts for the organic hydroperoxide epoxidation of lower olefins, inorganic compounds of vanadium are not similarly effective for lower olefins. However, for allyl alcohol, it has been discovered that inorganic vanadium compounds are outstanding and superior catalysts for conversion to glycidol using a variety of organic hydroperoxides, but especially with ethyl benzene hydroperoxide. In view of the above statement, it was also surprising to find that these outstanding results are obtained only when using these inorganic vanadium compounds in combination with an organic hydroperoxide. This combination is unexpected and surprising when one considers that epoxidation of allyl alcohol in the presence of inorganic vanadium compounds with other peroxide reactants such as $O_2$, or when employing inorganic catalysts such as tungsten with an organic hydroperoxide do not lead to the same outstanding results. These discoveries will be further described in our examples.

It has been discovered that although organic hydroperoxides in general may be used, in the epoxidation of allyl alcohol, ethylbenzene hydroperoxide (alpha phenyl ethyl hydroperoxide) possesses unique and inventive utility in the epoxidation of allyl alcohol to the corresponding oxirane compound. It has been found that among the species of organic hydroperoxides, alpha phenyl ethyl hydroperoxide is surprisingly very much superior to the other hydroperoxides in this reaction. Accordingly, in a particular exceedingly advantageous practice of the invention, alpha phenyl ethyl hydroperoxide is employed in the epoxidation of allyl alcohol.

Additionally, it has been found that, among the catalyst species for the epoxidation of allyl alcohol, inorganic vanadium compounds have unique and inventive utility, over other catalysts.

The hydroperoxides which are employed in the epoxidation of allyl alcohol in the invention are those having the formula ROOH wherein R is a substituted or unsubstituted alkyl, cycloalkyl or aralkyl radical having about three to 20 carbon atoms. R may also be a heterocyclic or like radical. Preferably, the R radical is a lower alkyl, cyclo-lower alkyl, or ar-lower alkyl, wherein lower alkyl may be from one–nine carbons.

Illustrative hydroperoxides are phenyl lower alkyl hydroperoxides such as cumene hydroperoxide, lower alkyl hydroperoxides such as tertiary butyl hydroperoxide, cyclohexanone peroxide, tetralin hydroperoxide, methyl ethyl ketone peroxide, methylcyclohexane hydroperoxide, and the like. Ethylbenzene hydroperoxide, however, is by far the preferred hydroperoxide.

In the oxidation, the ratio of allyl alcohol to organic peroxy compounds can vary over a wide range. Generally, mol ratios of olefinic groups in the substrates to hydroperoxide broadly in the range of 0.5:1 to 100:1, desirably 1:1 to 20:1 and preferably 2.1 to 10:1 are employed.

The concentration of hydroperoxide in the substrate oxidation reaction mixture at the beginning of the reaction will normally be 1 percent or more although lesser concentrations will be effective and can be used.

The inorganic vanadium compounds such as vanadium pentoxide, dioxide, trioxide, tetraoxide, disulfide, trisulfide, pentasulfide, and the like can be used, as well as heteropoly acids, such as phospho vanadic acid, or other heteropoly inorganic compounds containing vanadium, or alkali salts of the acids as well as mixtures of the various compounds. Preferably, however, the various vanadium oxides are used, especially vanadium pentoxide. The amount of metal in solution used as catalyst can be varied widely, although as a rule it is desirable to use at least 0.00001 mols and preferably 0.002 to 0.03 mols per mol of hydroperoxide present. Amounts greater than about 0.1 mols seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom.

The reactions can be carried out in the presence of a solvent, and, in fact, it is generally desirable that one be used. In general, aqueous solvents are not contemplated. Among the suitable substances are hydrocarbons, which may be aliphatic, naphthenic or aromatic, and the oxygenated derivatives of these hydrocarbons. Preferably, the solvent has the same carbon skeleton as the hydroperoxide used, so as to minimize or avoid solvent separation problems.

The reaction may be carried out at any suitable temperature such as from about room temperature to about 150° C., preferably, however, the reaction is carried out at from about 50°–120° C. The time of reaction is not critical and may vary from about 15 minutes to 2 or more days depending upon the concentrations of catalyst as well as temperature of reaction. In the preferred reaction the time may vary from about 15 minutes to about 3 hours.

Basic substances may be employed in the epoxidation reaction. The basic substances which are employed in the present invention are alkali metal compounds or alkaline earth metal compounds. Particularly preferred are the compounds of sodium, potassium, lithium calcium, magnesium, rubidium, cesium, strontium and barium, Compounds which are employed are those which most preferably are soluble in the reaction medium. However, insoluble forms can be employed and are effective when dispersed in the reaction medium. Organic acid compounds such as a metal acetate, naphthenate, stearate, octoate, butyrate, and the like can be employed. Additionally, inorganic salts such as Na carbonate, Mg carbonate, trisodium phosphate, and the like can also be employed. Particularly preferred species of metal salts include sodium naphthenate, potassium stearate, magnesium carbonate, and the like. Hydroxides and oxides of alkali and alkali earth metal compounds can be used. Examples are NaOh, MgO, CaO, $Ca(OH)_2$, KOH, and the like. Alkoxides, e.g., Na ethylate, K cumylate, Na phenate, etc. can be used. Amides such as $NaNH_2$ can be used as can quaternary ammonium salts. In general, any compound of alkali or alkali earth metals giving a basic reaction in water can be used.

The compound is employed during the epoxidation reaction in amounts of 0.05 to 10 mols/mol of epoxidation catalyst desirably 0.25 to 3.0 and preferably 0.50 to 1.50. It has been found that as a result of the incorporation of the basic compound in the reaction system, improved efficiencies in the utilization of the organic hydroperoxides in the epoxidation are achieved.

The allyl alcohol starting material may be prepared by any well known procedure. For example, the isomerization of propylene oxide to allyl alcohol is carried out in accordance with generally known techniques as shown, in British Pat. No. 924,234 and in U.S. Pat. No. 2,426,264. Preferably the isomerization is carried out in the vapor phase employing temperatures in the range of about 200° to 300° C., and preferably 230° to 270° C. Isomerization catalysts are suitably employed.

If desired, the hydrolysis of the allyl alcohol epoxide,

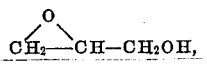

may be conveniently carried out by reacting the epoxide with water with temperatures generally in the range 20° to 200° C., and preferably 80° to 150° C. Catalysts are preferably used. These catalysts are generally of the acid or basic type, preferred catalysts being: NaOh, $H_2SO_4$, sulfonic acid ion exchange resins, KOH, $HNO_3$, p-toluene sulfonic acid, and the like.

The following examples illustrate the invention:

EXAMPLE 1

Propylene Oxide

About 4,300 grams of a 70 percent propylene–30 percent propane mixture are contacted with a mixture of 5,700 grams of 38.7 weight percent alpha phenyl ethyl hydroperoxide in ethylbenzene, 40 grams of molybdenum naphthenate (5 percent by wt. Mo) and 29 grams of sodium naphthenate solution containing 0.8 wt. % Na. The mixture is reacted at elevated pressure for 1 hour at 110° C.

Unreacted propylene is flashed with propane and recovered for recycle after propane purge.

The reaction mixture is distilled and product propylene oxide is recovered overhead.

EXAMPLE 2

Allyl Alcohol

Propylene oxide obtained from example 1 is isomerized to allyl alcohol using lithium phosphate catalyst. The propylene oxide in the vapor phase in amount of 100 grams is passed through a bed of particulate lithium phosphate at 250° C., and at the rate of about 1 volume of propylene oxide vapor volume of catalyst per hour.

EXAMPLE 3

Glycidol

This example is provided to demonstrate the outstanding superiority of vanadium catalysts in the conversion of allyl alcohol to glycidol.

In runs 1 through 8 of the following table, the charge mixture contained by weight 5 percent ethylbenzene hydroperoxide, 10.5 percent allyl alcohol, the specified percentage of catalyst, and the remainder ethylbenzene. In run 9, the charge mixture contained by weight 5.5 percent cumene hydroperoxide, 10.5 percent allyl alcohol, the specified percentage of catalyst, and the remainder cumene.

Similarly when vanadium dioxide, trioxide, tetroxide, disulfide, trisulfide, pentasulfide or phospho vanadic acid is used in place of vanadium pentoxide in run 1 above similar results are obtained.

Similarly when cyclohexanone peroxide, tetralin hydroperoxide, methyl ethyl ketone hydroperoxide, tertiary butyl hydroperoxide or methyl cyclohexane hydroperoxide is used in place of ethyl benzene hydroperoxide in run 1 above, similar results are obtained.

Similarly, when 0.028, 0.56 or 0.14 percent of catalyst is used in run 1 above in place of 0.28 percent similar results are obtained.

Similarly when the temperature and time of reaction used in run 1 above is 10 minutes and 150° C., 3 hours and 50° C., or 15 minutes and 120° C. respectively in place of 100 and 90° C., similar results are obtained.

EXAMPLE 4

A mixture of 90.7 g. $H_2O$, 7.3 g. allyl alcohol (0.126 moles), 5.7 g. TBHP (0.063 moles and 0.44 g. tungstic acid was agitated at 65° C. for 4 hours. The mixture was filtered and analyzed by titration for epoxide. Epoxide concentration as glycidol was less than 0.04 percent. The theoretical concentration based on TBHP would be about 4.5 percent. Therefore the yield is less 1 percent.

EXAMPLE 5

A mixture of 50 g. allyl alcohol and 2.5 g. $V_2O_5$ was agitated at 65° C. for 21 hours with a stream of $O_2$ bubbling through the liquid. The mixture was filtered and the filtrate 42.8 g., analyzed by titration for epoxide. The epoxide concentration calculated as glycidol was less than 0.04 percent (limit of detection).

Examples 4 and 5 illustrate the surprising discovery that when vanadium is used in combination with an oxidizing agent such as oxygen, or if the reaction is carried out with an organic hydroperoxide with an inorganic metal catalyst other than vanadium, the results are markedly inferior then those obtained in runs 1,2 and 9 above.

What is claimed is:

1. A process for preparing glycidol which comprises reacting allyl alcohol with an organic hydroperoxide in the liquid phase at a temperature of 20°–150° C. in the presence of an inorganic vanadium compound catalyst.

2. The process of claim 1 wherein the catalyst is an oxide of vanadium.

3. The process of claim 1 wherein the hydroperoxide is an ar-lower alkyl hydroperoxide.

4. The process of claim 1 wherein the catalyst is an oxide of vanadium and the hydroperoxide is an ar-lower alkyl hydroperoxide.

5. The process of claim 1 wherein the hydroperoxide is alpha phenethyl hydroperoxide.

6. The process of claim 1 wherein the hydroperoxide is alpha phenethyl hydroperoxide and the catalyst is an oxide of vanadium.

7. The process of claim 1 wherein the hydroperoxide is alpha phenethyl hydroperoxide and the catalyst is vanadium pentoxide.

8. The process of claim 1 wherein the catalyst is vanadium pentoxide.

9. The process of claim 1 wherein the catalyst is vanadium pentoxide and the hydroperoxide is an ar-lower alkyl hydroperoxide.

| Run No. | Catalyst | Percent catalyst | Temp., °C. | Time, min. | Hydroperoxide conversion, percent | Selectivity to glycidol, percent |
|---|---|---|---|---|---|---|
| 1 | $V_2O_5$ | 0.28 | 90 | 100 | 97.8 | 77.1 |
| 2 | $V_2O_5$ | 0.28 | 110 | 30 | 94.3 | 87.8 |
| 3 | Tetrabutyl titanate. | 0.09 | 110 | 90 | 97.0 | 62.4 |
| 4 | Ta naphthenate (9.42% Ta). | 0.6 | 110 | 180 | 20.5 | 22.6 |
| 5 | Nb naphthenate (4.84% Nb). | 0.6 | 110 | 120 | 21.7 | 21.7 |
| 6 | Tungsten carbonyl. | 0.56 | 110 | 120 | 24.2 | 72.2 |
| 7 | Mo naphthenate (5% Mo). | 0.3 | 110 | 25 | 92.9 | 72.2 |
| 8 | None | None | 110 | 60 | 2.7 | 0.0 |
| 9 | $V_2O_5$ | 0.28 | 110 | 90 | 93.5 | 76.9 |